US009281532B2

(12) United States Patent
Lebzelter et al.

(10) Patent No.: US 9,281,532 B2
(45) Date of Patent: Mar. 8, 2016

(54) REMEDIAL ACTIONS FOR AIR FLOW ERRORS IN A FUEL CELL SYSTEM

(71) Applicant: GM GLOBAL TECHNOLOGY OPERATIONS LLC, Detroit, MI (US)

(72) Inventors: Derek R. Lebzelter, Fairport, NY (US); Loren Devries, Ionia, NY (US); Todd K. Preston, Highland, MI (US); Joseph Mussro, Pittsford, NY (US); John P. Nolan, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 13/844,102

(22) Filed: Mar. 15, 2013

(65) Prior Publication Data

US 2014/0272654 A1 Sep. 18, 2014

(51) Int. Cl.
*H01M 8/04* (2006.01)

(52) U.S. Cl.
CPC ...... *H01M 8/04395* (2013.01); *H01M 8/04089* (2013.01); *Y02E 60/50* (2013.01)

(58) Field of Classification Search
CPC ..................... H01M 8/04395; H01M 8/04089
USPC ......................................................... 429/432
See application file for complete search history.

(56) References Cited

U.S. PATENT DOCUMENTS

2011/0113857 A1* 5/2011 Sinha .......................... 73/29.02

* cited by examiner

*Primary Examiner* — Stewart Fraser
(74) *Attorney, Agent, or Firm* — John A. Miller; Miller IP Group, PLC

(57) ABSTRACT

A system and method for operating a fuel cell stack of a fuel cell system in a vehicle when an error in cathode air flow rate is detected. The system and method include estimating a cathode air flow rate and detecting an error in the estimated cathode air flow rate. The system and method also include utilizing high frequency resistance measurements from a high frequency resistance sensor to control a relative humidity of the fuel cell stack when the error in the estimated cathode air flow rate has been detected.

20 Claims, 1 Drawing Sheet

10
38
36
44
42
18
14
46
34
16
48
40
12
32
20
22
24
26
30

REMEDIAL ACTIONS FOR AIR FLOW ERRORS IN A FUEL CELL SYSTEM

BACKGROUND OF THE INVENTION

1. Field of the Invention

This invention relates generally to a method for continuing to operate a fuel cell system when an error in a cathode air flow estimation is detected and, more particularly, to a method for increasing air flow to a fuel cell stack when an error in a cathode air flow estimation is detected and a minimum cell voltage drops below a predetermined threshold.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack. For stack durability purposes, it is desirable to minimize the number of relative humidity cycles of the membrane because cycling between RH extremes has been shown to severely limit membrane life. Membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life.

As mentioned above, water may be generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. Water in the cathode exhaust gas at one side of the membrane is absorbed by the membrane and transferred to the cathode air stream at the other side of the membrane.

During operation of the fuel cell, moisture from the MEAs and external humidification may enter the anode and cathode flow channels. At low cell power demands, typically below 0.2 $A/cm^2$, the water may accumulate within the flow channels because the flow rate of the reactant gas is too low to force the water out of the channels. As the water accumulates, droplets form in the flow channels. As the size of the droplets increases, the flow channel is closed off, and the reactant gas is diverted to other flow channels because the channels are in parallel between common inlet and outlet manifolds. As the droplet size increases, surface tension of the droplet may become stronger than the delta pressure trying to push the droplets to the exhaust manifold so the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

As discussed above, it is generally necessary to control stack humidity so that the membranes in the stack have the proper electrical conductivity, but where the flow channels do not become blocked by ice if the water freezes during system shut-down. It is known in the art to provide an RH sensor in the cathode air inlet of a fuel cell system to measure the humidification of the cathode inlet gas stream as it enters the stack. Using the measured inlet relative humidity and the water specie balance, or mass balance of water, the RH profile of the fuel cell system, including cathode air outlet flow, can be estimated.

High frequency resistance (HFR) is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined. This HFR measurement allows for an independent measurement of the fuel cell membrane humidification, thereby eliminating the need for RH sensors.

The average HFR of a fuel cell stack, terminal to terminal, provides a good measure of average stack membrane humidification, $RH_{avg}$. While controlling fuel cell stack membrane humidification using $RH_{avg}$ may be sufficient to meet efficiency targets, it is the presence of liquid water in the cathode inlet flow channels and the cathode outlet flow channels that directly correlates to poor reliability, durability and damage caused by freezing in a fuel cell system.

Mass air flow sensors are typically used to estimate cathode air flow to a fuel cell stack. A cathode by-pass valve is typically used to control the amount of cathode exhaust gas that is sent to the WVT unit to humidify cathode inlet gas. When the mass flow meter and the cathode by-pass valve are functioning normally the total error in cathode air flow will be small, for example, an error greater than 2% at a cathode airflow of 20-140 grams/second and an error less than 1.5% at a cathode airflow of 2-20 grams/second. However, when sensors or actuators in the cathode system fail, higher errors in cathode air flow may result. Thus, there is a need in the art to provide a way to continue to operate the fuel cell system when cathode air flow errors have occurred without damaging the fuel cell stack due to poor humidification and/or operating under a desired cathode stoichiometry.

SUMMARY OF THE INVENTION

In accordance with the teachings of the present invention, a system and method for operating a fuel cell stack of a fuel cell system in a vehicle when an error in cathode air flow rate is detected is disclosed. The system and method include estimating a cathode air flow rate and detecting an error in the estimated cathode air flow rate. The system and method also include utilizing high frequency resistance measurements from a high frequency resistance sensor to control a relative humidity of the fuel cell stack when the error in the estimated cathode air flow rate has been detected.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for continuing to operate a fuel cell system when a mass air flow meter or a cathode valve has failed is merely exemplary in nature, and is in no way intended to limit the invention or its applications or uses.

Figure 1:
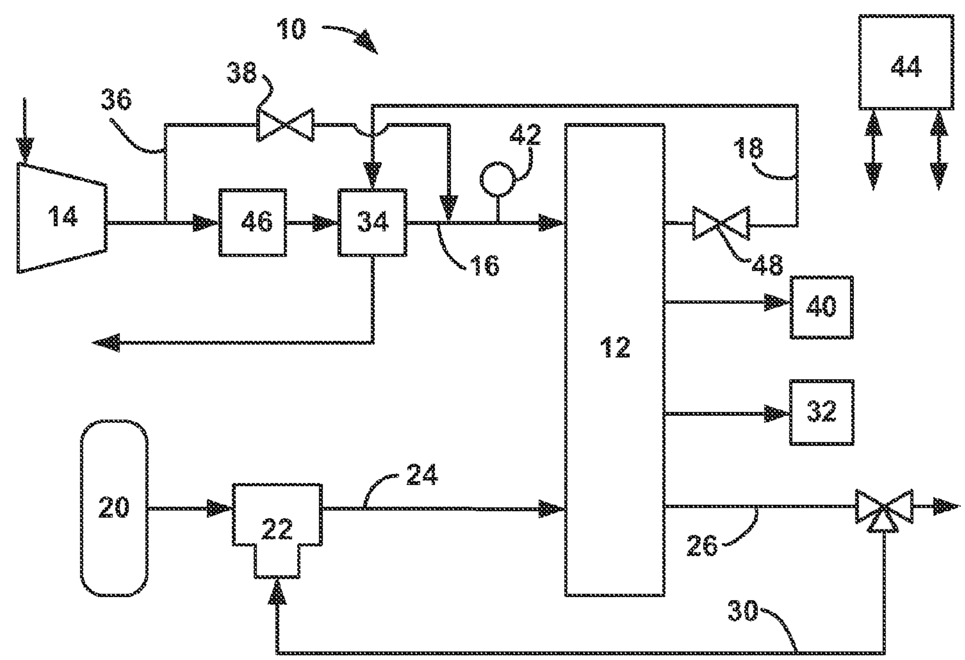
FIG. 1 is a schematic block diagram of a fuel cell system.

FIG. 1 is a schematic block diagram of a fuel cell system 10 including a fuel cell stack 12. A compressor 14 provides an airflow to the cathode side of the fuel cell stack 12 on a cathode input line 16 through a water vapor transfer (WVT) unit 34 that humidifies the cathode input air. A cathode exhaust gas is output from the stack 12 on a cathode exhaust gas line 18 through a back-pressure valve 48 that directs the cathode exhaust gas to the WVT unit 34 to provide the humidity to humidify the cathode input air. A by-pass line 36 is provided around the stack 12 to direct some or all of the cathode input airflow around the stack 12. A by-pass valve 38 is provided in the by-pass line 36, where the positions of the back-pressure valve 48 and the by-pass valve 38 are selectively controlled by a controls unit 44 to direct the cathode inlet airflow through or around the stack 12 so that air can be bypassed around a potentially hydrogen-filled stack during system 10 start-up. As the start-up progresses, the air is progressively put through the stack until the bypass line 36 is closed using the by-pass valve 38. An RH sensor 42 is provided in the cathode input line 16 to provide an RH measurement of the cathode input airflow after it has been humidified by the WVT unit 34 and to provide an RH measurement input to a cathode humidification unit (CHU) discussed below. A mass air flow meter 46 is also provided in the cathode input line 16 to provide a mass flow measurement of the amount of cathode input airflow that is entering the fuel cell stack 12.

The fuel cell system 10 also includes a source 20 of hydrogen fuel or gas, typically a high pressure tank that provides the hydrogen gas to an injector 22 that injects a controlled amount of the hydrogen gas to the anode side of the fuel cell stack 12 on an anode input line 24. Although not specifically shown, one skilled in the art would understand that various pressure regulators, control valves, shut-off valves, etc. would be provided to supply the high pressure hydrogen gas from the source 20 at a pressure suitable for the injector 22. The injector 22 can be any injector suitable for the purposes discussed herein.

An anode effluent output gas is output from the anode side of the fuel cell stack 12 on an anode output line 26, which is provided to a bleed valve 28. As is well understood by those skilled in the art, nitrogen cross-over from the cathode side of the fuel cell stack 12 dilutes the hydrogen gas in the anode side of the stack 12, thereby affecting fuel cell stack 12 performance. Therefore, it is necessary to periodically bleed the anode effluent gas from the anode sub-system to reduce the amount of nitrogen in the anode sub-system, as is known to those skilled in the art. When the system 10 is operating in a normal non-bleed mode, the bleed valve 28 is in a position where the anode effluent gas is provided to a recirculation line 30 that recirculates the anode gas to the injector 22 to operate it as an ejector and provide recirculated hydrogen gas back to the anode input of the stack 12. When a bleed is commanded to reduce the nitrogen in the anode side of the stack 12, the bleed valve 28 is positioned to direct anode effluent out of the anode output line 26. Typically the anode effluent is directed to a cathode inlet line or a cathode exhaust line, although not shown for the sake of clarity. Although the system 10 is an anode recirculation system, the present invention will have application for other types of fuel cell systems, including anode flow-shifting systems.

The fuel cell system 10 also includes a high frequency resistance (HFR) circuit 40 that determines stack membrane humidity of the membranes in the stack 12. The HFR circuit 40 determines the high frequency resistance of the fuel cell stack 12, where a high frequency resistance signal is provided to the controls unit 44 and used to determine the humidification of the cell membranes within the stack 12. The HFR circuit 40 operates by determining the ohmic resistance, or membrane protonic resistance, of the fuel cell stack 12 in a manner that is known to those skilled in the art. Membrane protonic resistance is a function of membrane humidification of the fuel cell stack 12. When the air flow entering the cathode side of the stack 12 is inaccurate, for example an error that is greater than 3%, the fuel cell system 10 will increase air flow based on the error, described in detail below, such that the fuel cell system 10 may continue to operate. A battery 32 is provided as a source of power to the fuel cell system 10 when the stack 12 is not producing enough power to support fuel cell system and/or vehicle loads. The battery 32 may receive power from the stack 12 to charge in a manner that is understood by those skilled in the art.

Figure 2:
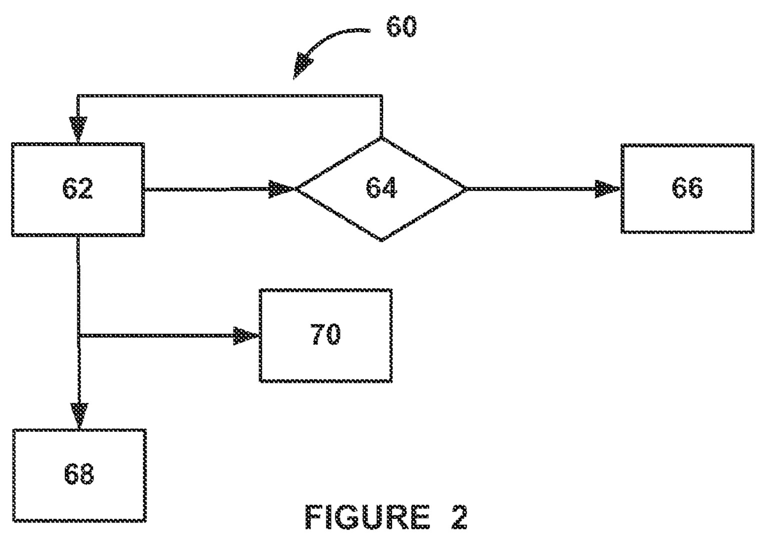
FIG. 2 is a flow diagram of a method for operating the fuel cell system when a cathode air flow estimation error has been detected.

When a cathode air flow rate estimate is not accurate due to, for example, a mass air flow meter error or the cathode by-pass valve 38 being stuck open, an algorithm that is part of the controls unit 44 of the fuel cell system 10 is initiated. A determination that the cathode air flow rate estimate is not accurate may be made by comparing a cathode air flow model based on power output of the fuel cell stack 12 to the output from the mass flow meter 46. FIG. 2 is a flow diagram 60 of the algorithm of the controls unit 44 that allows the fuel cell system 10 to continue to operate under normal operating conditions when a cathode air flow rate estimate is not accurate. The algorithm detects that the air flow rate estimate is not accurate at box 62. Next, the algorithm determines if a minimum fuel cell stack voltage reaches a predetermined threshold value at decision diamond 64. If no, the algorithm returns to the box 62. If yes, the algorithm will cause the fuel cell system 10 to run with an air flow set point that ensures that the air flow being fed to the cathode side of the fuel cell stack 12 is more than a minimum air flow. This air flow set point considers the error of the cathode air flow rate estimate. A minimum cell voltage that falls below a predetermined minimum cell voltage threshold value indicates that the fuel cell stack 12 is operating under conditions that are below the necessary stoichiometry for the fuel cell chemical reactions to take place. Thus, a cathode stoichiometry set point generator of the controls unit 44 will ignore the standard deviation error estimate sent out by the cathode air error estimation algorithm to the controls unit 44 while still attempting normal cathode stoichiometry control, until a fault is detected in the mass air flow meter 46 or the by-pass valve 38 is determined to be stuck open, When one of these conditions exist, the set point generator of the controls unit 44 will continue to ignore the cathode air flow errors until a minimum cell voltage falls below the predetermined minimum cell voltage threshold value. For example, the minimum cell voltage threshold may be when a minimum cell voltage falls below 300 mV from an average cell voltage.

Once the minimum cell voltage threshold has been reached at the decision diamond 64, the algorithm takes action to prevent what is perceived to be cathode starvation. At this point, the algorithm determines a minimum cathode stoichiometry that is needed to draw a desired current density at box 66. An example may be a cathode stoichiometry of 1.4. At the box 66, the algorithm determines the minimum cathode airflow necessary by multiplying the estimated standard deviation of the air mass flowrate by some factor to determine a total error. For example, an initial guess may be to define the error as 3 standard deviations, which would encompass 99.7% of all cathode air flow estimation failure cases. Subtracting the 3 standard deviations from a reported air flow rate gives a minimum flow rate that considers the estimated error. The minimum flow rate estimate needs to be greater than what corresponds to the minimum allowed cathode stoichiometry to correct the minimum cell voltage condition. If the minimum flow rate estimate does not correct the minimum cell voltage, the cathode stoichiometry set point is increased such that the minimum error is higher than the required flow rate. The increase in cathode air flow at the box 66, i.e., the cathode stoichiometry correction, is used until the cathode air flow estimation error fault condition is cleared.

Air flow rate is one of the biggest contributors to stack outlet humidification with a huge influence on inputs and outputs to a cathode humidification unit (CHU) model of the controls unit 44. Air flow rate errors are likely to be greater than 25%, thus, the CHU model will no longer be predictive when cathode air flow estimation errors occur. Thus, high frequency resistance (HFR) feedback from the HFR circuit 40 is used to control humidity at box 68 regardless of the minimum cell voltage condition if a cathode air flow rate estimation error is detected at the box 62. More specifically, HFR is used to control humidity at the box 68 if the by-pass valve 38 is opened for longer than a predetermined threshold or if an air mass flow meter 46 fault is detected.

To maximize HFR sensitivity of the HFR circuit 40, the fuel cell stack 12 is operated under set point conditions that are drier than normal. Otherwise, the controls unit 44 would be unable to differentiate desired fuel cell stack 12 humidification setpoints, for example, 75 to 90% relative humidity (RH) from much wetter conditions that may cause instability of the stack 12. Thus, the controls unit 44 uses RH set points that yield HFR values that are at least 10 mOhm-cm$^2$ away from the wet asymptote discussed above. Such a continuous dry operation of the stack 12 does, however, preclude any HFR based resistance learning, discussed in detail in copending application Ser. No. 12/262,212 entitled "Online Estimation of Cathode Inlet and Outlet RH from Stack Average HFR", filed Nov. 19, 2009, assigned to the assignee of this application and incorporated herein by reference. Without HFR based resistance learning the accuracy of humidity control using HFR at the box 68 may become poor if the stack 12 recently experienced an air/air condition, resetting the HFR recoverable drift.

Beyond the scope of the air flow rate set point is the behavior that the fuel cell system 10 could exhibit to keep the stack 12 out of conditions that could cause severe overdrying. At low current density and thus low air flow rate, cathode air flow errors are going to be the highest. In certain cases, the error may be +/− 100% of the reported cathode air flow value. Thus, the controls unit 44 increases the minimum load that can be applied to the fuel cell system 10 to a predetermined minimum load threshold, such as≥0.1 A/cm$^2$, at box 70. The minimum load required at the box 70 becomes a binding requirement the vehicle must meet.

The fuel cell system 10 relies on the battery 32 to support loads that are below the predetermined threshold value, for example below 0.1 A/cm$^2$. If the state of charge of the battery 32 is, for example, 90% of the design maximum state of charge, the controls unit 44 may shutdown the fuel cell stack 12 and the vehicle may run on battery power. If the state of charge of the battery 32 is low, for example within 20% of the design minimum state of charge, the algorithm may operate the fuel cell stack 12 at its most efficient point to charge the battery 32 until the state of charge of the battery 32 is above a predetermined state of charge threshold, such as approximately 100%. The most efficient operating point for the stack 12 may be where the cathode air flow rate model has the highest fidelity.

Using the algorithm discussed above, the fuel cell system 10 may continue to operate when the mass air flow meter 46 or the cathode bypass valve 38 has failed, although it is expected that the performance of the fuel cell system 10 and/or vehicle will be reduced.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for operating a fuel cell stack of a fuel cell system in a vehicle, said method comprising:

estimating a cathode air flow rate from cathode inlet air mass flow measurements;

detecting an error in the estimated cathode air flow rate by comparing the estimated cathode air flow rate to a cathode air flow model that is based on output power of the fuel cell stack;

determining whether a predetermined minimum cell voltage threshold value of voltage of fuel cells in the fuel cell stack has been reached;

adjusting the cathode air flow rate to the fuel cell stack to be a cathode air flow set point if the predetermined minimum cell voltage threshold value has been reached; and utilizing high frequency resistance measurements from a high frequency resistance sensor to control a relative humidity of the fuel cell stack when the error in the estimated cathode air flow rate has been detected.

2. The method according to claim 1 further comprising increasing a minimum load that can be applied to the fuel cell system once the error in the estimated cathode air flow rate has been detected.

3. The method according to claim 2 wherein increasing the minimum load includes charging a battery of the fuel cell system.

4. The method according to claim 3 further comprising placing the fuel cell stack in an idle or shutdown mode and operating the vehicle using battery power if a state of charge of the battery is approximately 100%.

5. The method according to claim 1 wherein the cathode air flow set point is a minimum cathode air flow rate that is needed to draw a predetermined current density.

6. The method according to claim 5 further comprising increasing the minimum cathode air flow rate that is needed to draw a predetermined current density until a minimum cell voltage increases above the predetermined minimum cell voltage threshold value.

7. The method according to claim 6 further comprising maintaining the increased minimum cathode air flow rate until the detected cathode air flow rate estimation error fault condition is cleared.

8. A method for operating a fuel cell stack of a fuel cell system in a vehicle, said method comprising:

estimating a cathode air flow rate from cathode inlet air mass flow measurements;

detecting an error in the estimated cathode air flow rate by comparing the estimated cathode air flow rate to a cathode air flow model that is based on power output of the fuel cell stack; and utilizing high frequency resistance measurements from a high frequency resistance sensor to control a relative humidity of the fuel cell stack when the error in the estimated cathode air flow rate has been detected.

9. The method according to claim 8 further comprising determining whether a predetermined minimum cell voltage threshold value of voltage of fuel cells in the fuel cell stack has been reached, wherein the cathode air flow rate to the fuel cell stack is adjusted to be a cathode air flow set point if the predetermined minimum cell voltage threshold value has been reached.

10. The method according to claim 8 further comprising increasing a minimum load that can be applied to the fuel cell system once the error in the estimated cathode air flow rate has been detected.

11. The method according to claim 10 wherein increasing the minimum load includes charging a battery of the fuel cell system.

12. The method according to claim 11 further comprising placing the fuel cell stack in an idle or shutdown mode and operating the vehicle using battery power if a state of charge of the battery is approximately 100%.

13. The method according to claim 9 wherein the cathode air flow set point is a minimum cathode air flow rate threshold value that is needed to draw a predetermined current density.

14. The method according to claim 13 further comprising increasing the minimum cathode air flow rate threshold value until a minimum cell voltage increases above the predetermined minimum cell voltage threshold value and maintaining the increased minimum cathode air flow rate until the detected cathode air flow rate estimation error fault condition is cleared.

15. A system for operating a fuel cell stack of a fuel cell system in a vehicle, said system comprising:

a controls unit that includes:

means for estimating a cathode air flow rate from cathode inlet air mass flow measurements;

means for detecting an error in the estimated cathode air flow rate by comparing the estimated cathode air flow rate to a cathode air flow model that is based on power output of the fuel cell stack; and means for utilizing high frequency resistance measurements from a high frequency resistance sensor to control a relative humidity of the fuel cell stack when the error in the estimated cathode air flow rate has been detected.

16. The system according to claim 15 further comprising means for determining whether a predetermined minimum cell voltage threshold value of voltage of fuel cells in the fuel cell stack has been reached, wherein the cathode air flow rate to the fuel cell stack is adjusted to be a cathode air flow set point if the predetermined minimum cell voltage threshold value has been reached.

17. The system according to claim 15 further comprising increasing a minimum load that can be applied to the fuel cell system once an error in an estimated cathode air flow rate has been detected.

18. The system according to claim 17 wherein increasing the minimum loads includes charging a battery of the fuel cell system.

19. The system according to claim 18 further comprising means for placing the fuel cell stack in an idle or shutdown mode and operating the vehicle using battery power if a state of charge of the battery is near a maximum state of charge.

20. The system according to claim 16 wherein the cathode air flow set point is a minimum cathode air flow rate that is needed to draw a predetermined current density.

* * * * *